Patented Jan. 8, 1946

2,392,779

UNITED STATES PATENT OFFICE 2,392,779

DETERGENT COMPOSITION

Jere C. Showalter, Goose Creek, Tex., assignor to Standard Oil Development Company, a corporation of Delaware No Drawing. Application March 7, 1944, Serial No. 525,437

2 Claims. (Cl. 252—161)

The present invention is directed to a soap of the paste type commonly used by mechanics and others for the removal of grime and grease from the hands.

It has been a common practice to prepare such soaps by incorporating in a soft soap abrasive materials such as pumice, mica, sand and the like. Such preparations have an unpleasant feel and are not entirely effective for the removal of oil and grease from the pores.

The composition of the present invention is composed essentially of a large percentage of a petroleum oil, such as lubricating oil, gas oil, a substantial percentage of alkali metal petroleum sulfonates, sufficient water to impart desired consistency to the product and a nonabrasive filler, such as asbestos wool, cloth particles, finely divided paper, bagasse, rice hulls, cotton seed hulls or sawdust. The latter, because of its ready availability and peculiar adaptability to this use, is preferred. A soft wood sawdust which will pass through a 10-mesh screen forms a very satisfactory filler. Sawdust passing a 20-mesh screen is also satisfactory, but the filler should not be too fine, since the finer materials do not contribute as much benefit to the composition as do the coarser materials. The sawdust in effect acts like a wash rag. The oil acts as a solvent for grime and grease and leaves the hands soft after use; it also eliminates chapping and cracking of the skin during cold weather. The composition is neutral and does not cause burning when it comes into contact with cuts.

A particular composition which I have found to have the proper consistency and a highly effective cleansing action is composed of 78% by weight of a mixture containing 30% of sodium petroleum sulfonates, 36% petroleum oil and 34% water, in which mixture is incorporated 22% by weight of fine sawdust. Manifestly, there is some latitude in these proportions. In general, the filler should constitute from about 20% to about 30% by weight of the composition. The amount of water which may be incorporated in the composition will depend upon the amount of filler employed, the amount and nature of the petroleum oil and the emulsifying power of the sulfonates. Generally, the water content will be between 20% and 35% by weight of the total composition. The petroleum oil content and the sodium petroleum sulfonate content may each likewise vary between 20% and 35% by weight of the total composition.

As previously indicated, the petroleum oil employed is preferably a heavy distillate, such as heavy gas oil or lubricating oil, although clean residuals may also be employed. The sodium petroleum sulfonate employed may be any of those commonly known sulfonates which are obtained as by-products of the treatment of petroleum oil with concentrated sulfuric acid. The sodium petroleum sulfonates may be those derived from the oil layer or the sludge layer resulting from treatment of petroleum oil with concentrated sulfuric acid for the production of mineral white oil or both. These sulfonates may be used in their crude form. The sulfonates derived from the oil layer sulfonic acids are preferred.

The composition is a paste which is easily applied to the surfaces to be cleaned. It is best used by being rubbed into the soiled surfaces without the simultaneous use of water, the water being used merely to rinse the surfaces after they have been thoroughly massaged with the composition. The cleaned surfaces are soft and free from oil and grease. If desired, a scent may be incorporated in the composition.

The nature and objects of the present invenvention having been fully described, what I wish to claim as new and useful and to secure by Letters Patent is:

1. A cleansing composition in paste form comprising a mixture of 20% to 35% of a heavy petroleum oil distillate selected from the group consisting of lubricating oils and gas oils, 20% to 35% of a sodium petroleum sulfonate, 20% to 35% of water and 20% to 30% of a finely divided, nonabrasive, absorbent material, the proportions of the several ingredients being adjusted within the ranges given to total 100%.

2. A composition according to claim 1 in which the absorbent material is soft wood sawdust.

JERE C. SHOWALTER.